United States Patent [19]

Carmichael

[11] Patent Number: 5,350,339
[45] Date of Patent: Sep. 27, 1994

[54] DERAILLEUR PULLEY FOR USE WITH BICYCLE DERAILLEUR SYSTEMS

[76] Inventor: George H. Carmichael, 10 Farrar Rd., Rindge, N.H. 03461

[21] Appl. No.: 29,129

[22] Filed: Mar. 10, 1993

[51] Int. Cl.$^5$ ............................................. F16H 9/00
[52] U.S. Cl. .................................... 474/79; 474/120; 474/92
[58] Field of Search ................................... 474/78–81, 474/83, 101, 112, 113, 115–123, 131

[56] References Cited

U.S. PATENT DOCUMENTS

| | | | |
|---|---|---|---|
| 2,431,513 | 11/1947 | Schwinn | 474/80 |
| 3,125,894 | 3/1964 | Juy | 474/80 X |
| 3,478,614 | 11/1969 | Shimano | 474/160 |
| 4,047,603 | 9/1977 | Ozake | 474/160 X |
| 4,058,020 | 11/1977 | Huret et al. | 474/80 |
| 4,144,773 | 3/1979 | Addicks | 474/161 |
| 4,174,642 | 11/1979 | Martin et al. | 474/156 |
| 4,433,963 | 2/1984 | Shimano | 474/80 |
| 4,487,088 | 12/1984 | Olson | 474/152 X |
| 4,526,558 | 7/1985 | Durham | 474/152 |
| 4,575,365 | 3/1986 | Nagano | 474/80 |
| 4,580,327 | 4/1986 | Juy | 474/80 X |
| 4,608,878 | 9/1986 | Shimano | 474/152 X |
| 4,701,152 | 10/1987 | Dutil et al. | 474/80 X |
| 4,813,916 | 3/1989 | Valin | 474/158 X |
| 5,085,620 | 2/1992 | Nagano | 474/152 |

*Primary Examiner*—Roger J. Schoeppel
*Attorney, Agent, or Firm*—George W. Dishong

[57] ABSTRACT

An improved chain guide pulley or derailleur pulley for use with a bicycle rear derailleur system. The chain guide pulley has a guide sprocket portion and a bearing portion. The sprocket portion has, on a circular outer periphery, a plurality of teeth cut thereon. The teeth have dimensions so as to engage an endless drive chain and a cylindrical shaped inner peripheral surface defining thereby a bearing aperture. The bearing is dimensioned to be in an interfitting relationship with the guide sprocket and be attachable to the bicycle rear derailleur system. The teeth thickness dimension is not more than about three-fourths of a minimum distance between opposed pairs of roller link plates of the drive chain such that a less accurate alignment of the chain guide pulley with any one of the rear sprockets is required to effectively cause the drive chain to shift from any one of the sprockets to any other sprocket of the rear sprocket cluster. The chain guide pulley further has a number of circumferentially spaced-apart debris-clearing apertures. The apertures are located on a concentric between the bearing section and the circularly configured outer periphery. The debris-clearing apertures preferably have circular cross-sections. Materials selected from the group consisting of brass, bronze, aluminum and alloys thereof, titanium, iron and alloys thereof, nylon, teflon, plastic and fiberglass may be used in fabrication.

10 Claims, 2 Drawing Sheets

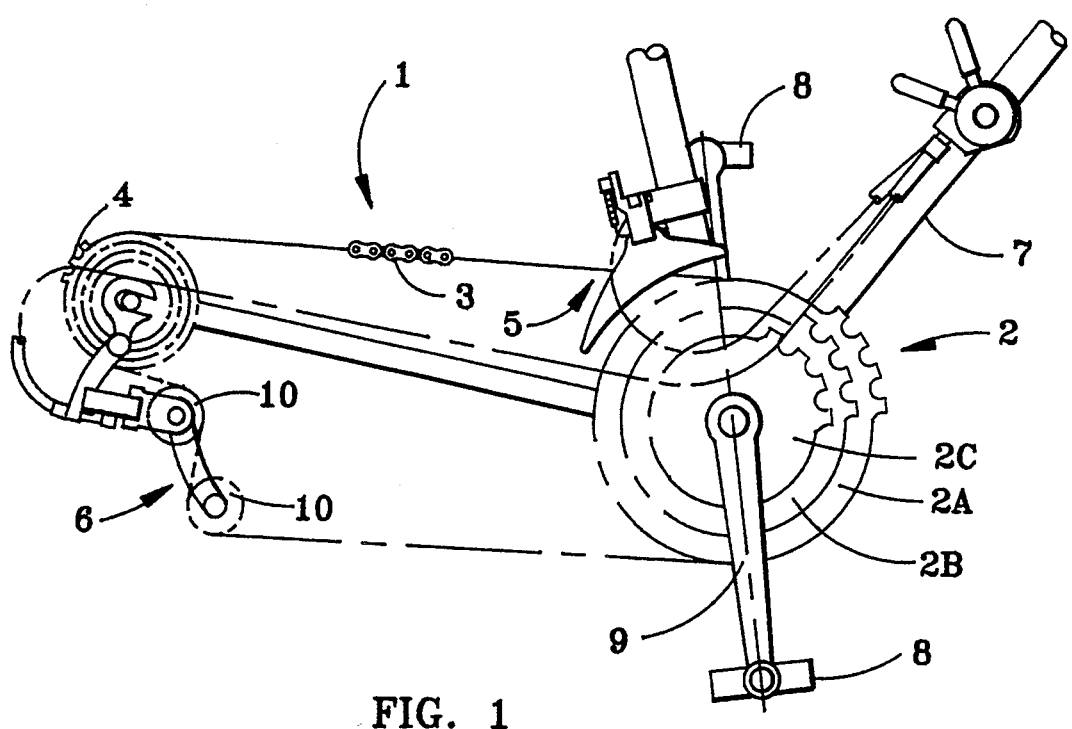
FIG. 1
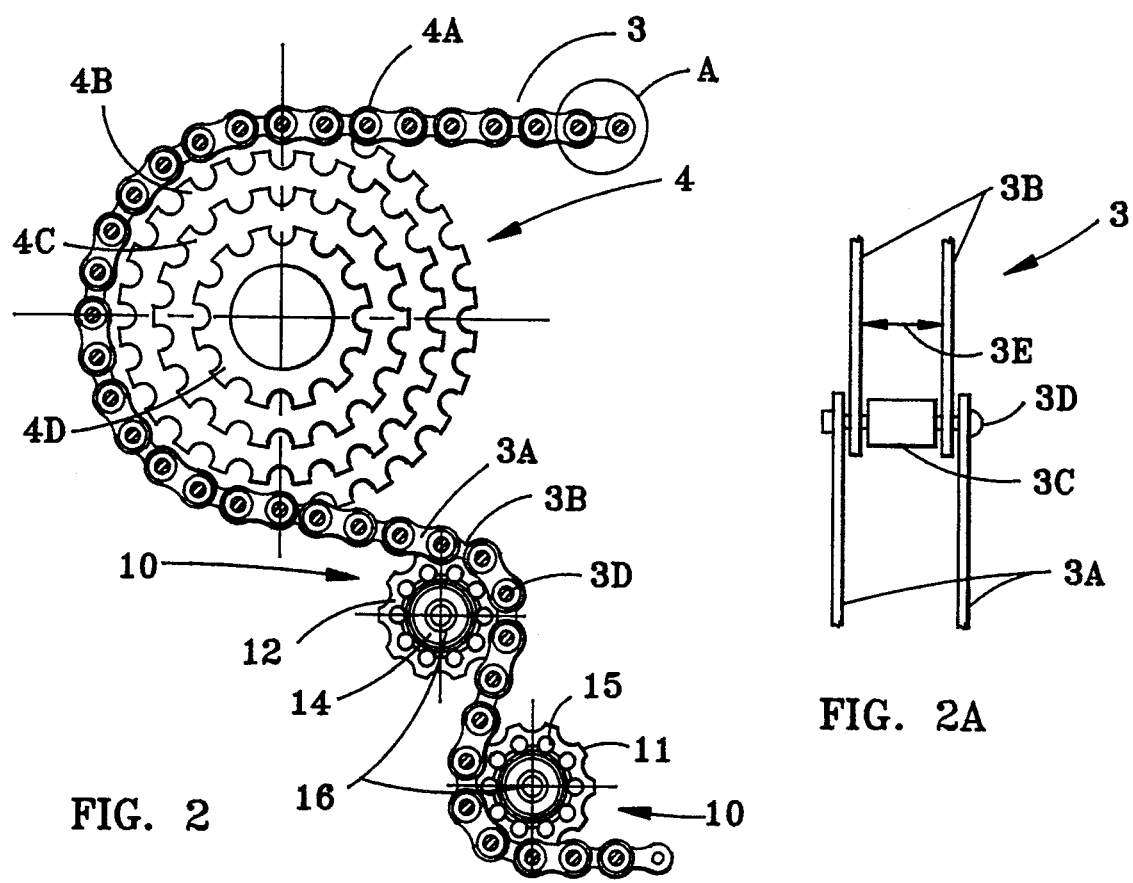
FIG. 2
FIG. 2A

DERAILLEUR PULLEY FOR USE WITH BICYCLE DERAILLEUR SYSTEMS

BACKGROUND OF THE INVENTION

1. Field of the Invention

This invention most generally relates to a chain guide pulley/ derailleur pulley for use, generally in pairs, with a bicycle rear derailleur system. The chain guide pulley has teeth having a thickness dimension which allows for an acceptable amount of misalignment of the pulley relative to a drive chain and a selectable rear sprocket of a free wheel cluster of a multi-speed bicycle. More particularly the chain guide pulley has a number of holes between the outer periphery and a bearing upon which low resistance rotation is provided. These holes-/apertures are not only effective to reduce the weight of the pulley, a very important consideration for bikers, but surprisingly these apertures improve, enhance and promote, while the bicycle is in use, the clearance of debris that tends to collect on currently used derailleur pulleys. For mountain bicycles this feature is of exceptional value and importance.

2. Description of the prior Art

Pulleys currently used as a part of drive chain rear derailleur assemblies have not had much consideration relative to providing improved performance. Most of the present pulleys use a rotational bearing system which allows for the lateral play of the toothed portion of the pulleys. This play is needed so that misalignments between the drive chain and the selected rear sprocket from which the chain is being guided from and also onto to change speeds do not result in inconsistent and inaccurate shifting. Pulleys using precision bearings which have no lateral play require continual or frequent adjustment and alignment of the shifting system in order to keep the rear derailleur functioning reliably and accurately.

In riding bicycles off-road or in mountainous and muddy/dirty terrain, debris or dirt/mud collects on the components of the speed changing system. This collection of debris also occurs on the derailleur guide pulleys of the rear derailleur assembly causing inconsistency in shifting and excessive wear. This problem with guide pulleys has not been addressed in any of the presently used pulleys known to the inventor hereof.

It would be advantageous to have a guide pulley or pulleys for use with bicycle derailleur systems having all of the particular objectives, features and advantages of: 1) Being strong and light in weight; 2) Being very low in rotational friction losses; 3) Compatibility with existing derailleur mechanisms or systems; 4) Having a tooth geometry which allows for an amount of misalignment of the derailleur and the gear cluster assembly providing thereby consistent and reliable speed changing using the derailleur mechanism; and 5) Special construction adaptable to cause debris collected onto the derailleur pulley to be constantly and easily removed and cleaned or cleared as a consequence of it being in use by the normal rotation thereof.

There is nothing currently available which satisfies these needs and objectives. However, this invention is particularly directed to an improved derailleur pulley or drive chain guide pulley which satisfies the objectives of a guide pulley which when used with conventionally known rear derailleurs for bicycles provides for an effective and reliable smooth speed change by lateral transfer of the drive train from any one rear sprocket to any other of the rear sprockets of the multi-gear rear cluster.

After reviewing patents which were developed in a search, no structure similar to the present invention was found nor was one suggested. None of the prior art known to the inventor hereof satisfies the needs for maintaining a clean guide pulley while in use, providing for smooth, consistent and error free speed change, and easily usable with the so-called index shifting systems without the need for constant alignment and adjustment as is the case with the prior art high performance pulleys i.e., those having rigid types of roller bearings. No one has considered that by simply making the teeth of the pulley with a thickness dimension substantially less than the minimum spacing between pairs of opposed roller link plates of the drive chain, the disadvantages heretofore associated and identified with pulleys using rigid high performance bearings would be overcome. Further, no one has realized that the placement of a plurality of apertures concentrically on the pulley would, with rotation in use, promote the clearing of dirt and debris from the pulleys.

The following patents relate to the technology of the present invention but none of them meets the objects of the guide pulley in a manner like that of the instant invention. None of the known prior art have addressed the problems associated with rear derailleur chain guide pulleys.

Essentially all of the patents are of interest only in that they all are

Essentially all of the patents are of interest only in that they all are directed to devices and mechanisms for use with the drive chain system of bicycles. However, none are expressly directed toward defining an improved derailleur pulley for use with bicycle derailleur systems with the construction, objects and advantages of the present invention.

U.S. Pat. No. 3,478,614 discloses a sprocket wheel with a narrow width. U.S. Pat. No. 4,144,773 discloses a sprocket with holes. Finally, U.S. Pat. No. 4,487,088 discloses a sprocket construction for zero catenary chain. Holes or apertures and teeth having narrow thickness are taught for incorporation into the gears of both the crank or front clusters and rear clusters. No one has discovered the advantages of derailleur pulleys having the features of this invention.

There are patents which disclose complicated tooth geometries and complicated slotting schemes to improve the shifting character of the derailleurs for both the front and rear of the multi-speed bicycle. The following patents are listed as representative of the patented prior art.

| U.S. PAT. NO. | INVENTOR | ISSUE DATE |
| --- | --- | --- |
| 5,085,620 | Nagano | 02/04/92 |
| 4,813,916 | Valin | 03/21/89 |
| 4,608,878 | Shimano | 09/02/86 |
| 4,526,558 | Durham | 07/02/85 |
| 4,487,088 | Olson | 12/11/84 |
| 4,174,642 | Martin et al | 11/20/79 |
| 4,144,773 | Addicks | 03/20/79 |
| 4,047,603 | Ozake | 09/13/77 |
| 3,478,614 | Shimano | 11/18/69 |

SUMMARY OF THE INVENTION

The present invention in it's most simple form or embodiment is directed to an improved derailleur pulley for use with bicycle derailleur systems. The derailleur pulley is frequently referred to herein as a drive chain guide pulley or simply a guide pulley and has the specific advantages of; being strong and light in weight, having very low in rotational friction losses, being compatible with existing derailleur mechanisms or systems and with the varied prior art rear cluster geometries, having a tooth geometry which allows for an amount of misalignment of the derailleur and the gear cluster assembly providing thereby consistent and reliable speed changing using the derailleur mechanism and special construction adaptable to cause debris collected onto the derailleur pulley to be constantly and easily removed and cleaned or cleared as a consequence of it being in use by the normal rotation thereof.

An object of the invention is to provide a bicycle having a drive chain, the drive chain having a minimum distance between each of a plurality of opposed pairs of roller link plates, at least two spaced-apart, coaxially mounted rear sprockets, the sprockets having teeth with arcuate roller seats adapted to accept a number of roller bushings of the drive chain. The bicycle also has an improved laterally-adjustable guide means with two rotatable guide pulleys as parts thereof. The guide means is adaptable for aligning each of the two rotatable guide pulleys with any one of the sprockets for guiding, with the two rotatable guide pulleys, the drive chain onto any one of the sprockets. The guide means is also adapted to cause the drive chain to shift from any one of the sprockets to any other. The improvement of the guide means comprises: two improved rotatable guide pulleys each having a substantially circularly configured outer periphery with a plurality of guide pulley teeth thereon adapted to engage the drive chain. The guide pulley teeth have a thickness dimension which is not more than about three-fourths of the minimum distance between the opposed pairs of roller link plates thereby requiring a less accurate alignment of the two improved guide pulleys with any one or the other of the sprockets. These features are effective to cause the drive chain to shift from any one of the sprockets to any other. Further there is provided a guide pulley bearing means fixedly centered within each of the two guide pulleys. The bearing means is adapted to permit substantially no lateral movement of the guide pulley teeth relative to the bearing means when the improved guide pulleys are in use for shifting the drive chain from any one to any other of the sprockets.

A further object of the invention is to provide the improved laterally-adjustable guide means as above described but further comprising a plurality of circumferentially spaced-apart debris-clearing apertures. The plurality of apertures are located on a concentric between the bearing means and the substantially circularly configured outer periphery and the apertures preferably are circular in cross section, i.e., holes.

A still further object of the invention is to provide the improved laterally-adjustable guide means as above described but wherein each of the two improved rotatable guide pulleys is made from at least one of the materials selected from the group consisting of brass, bronze, aluminum and alloys thereof, titanium, iron and alloys thereof, nylon, teflon, plastic and fiberglass.

A primary object of the invention is to provide a chain guide pulley for use with a bicycle rear derailleur system. The chain guide pulley comprises: a guide sprocket portion having, on a substantially circular outer periphery thereof, a plurality of teeth thereon. The teeth having predetermined width, depth and thickness dimensions and a cylindrical shaped inner peripheral surface defining thereby a bearing aperture. The bearing aperture has a periphery dimensioned to accept therein, into interfitting relationship, a bearing outer race; and a bearing having the bearing outer race tightly affixed within the bearing aperture and having an inner race sized to be attachable to the bicycle rear derailleur system. It is clear that the references bearing or bearing means may be a sleeve or bushing which is press-fit into the bearing aperture. The outside diameter of the bushing permitting tight mounting into the bearing aperture and the inside diametr of the bushing accepting the spindle of the rear derailleur portion upon which guide pulleys rotatably mount.

Another primary object of the invention is to provide the chain guide pulley as described above wherein the predetermined width, depth and thickness dimensions of the teeth are adapted to engage a drive chain. The teeth thickness dimension is not more than about three-fourths of a minimum distance between opposed pairs of roller link plates of the drive chain such that when the chain guide pulley is in use with the rear derailleur system, a less accurate alignment of the chain guide pulley with any one of a plurality of rear sprockets is required to effectively cause the drive chain to shift from any one of the sprockets to any other sprocket of the plurality of rear sprockets.

Yet another primary object of the invention is to provide the chain guide pulley as above further comprising a plurality of circumferentially spaced-apart debris-clearing apertures. The plurality of apertures are located on a concentric between the bearing and the substantially circularly configured outer periphery. Preferably, a predetermined number or all of the plurality of circumferentially spaced-apart debris-clearing apertures may have circular cross-sections.

Still yet another primary object of the invention is to provide the chain guide pulley as above wherein the chain guide pulley is made from at least one of the materials selected from the group consisting of brass, bronze, aluminum and alloys thereof, titanium, iron and alloys thereof, nylon, teflon, plastic and fiberglass.

These and further objects of the present invention will become apparent to those skilled in the art to which this invention pertains and particularly after a study of the following more detailed description of the various embodiments of the invention especially with reference to the accompanying drawings.

BRIEF DESCRIPTION OF THE DRAWINGS

FIG. 1 is a perspective illustration of that portion of a multi-speed bicycle having mounted thereon the components which effect the changing of the gearing and thus the potential speed of the bicycle;

FIG. 2 is a side view of the rear portion of the rear speed change mechanism or derailleur system illustrating only the positional relationship of the rear cluster and the guide pulleys and showing the engagement of the endless roller chain with both the guide pulleys and the rear cluster;

FIG. 2A is a top view of a section of the drive chain illustrating the minimum distance dimension of the chain links and the width into which the teeth of the guide pulleys must fit;

DESCRIPTION OF THE PREFERRED EMBODIMENTS

Figure 3:
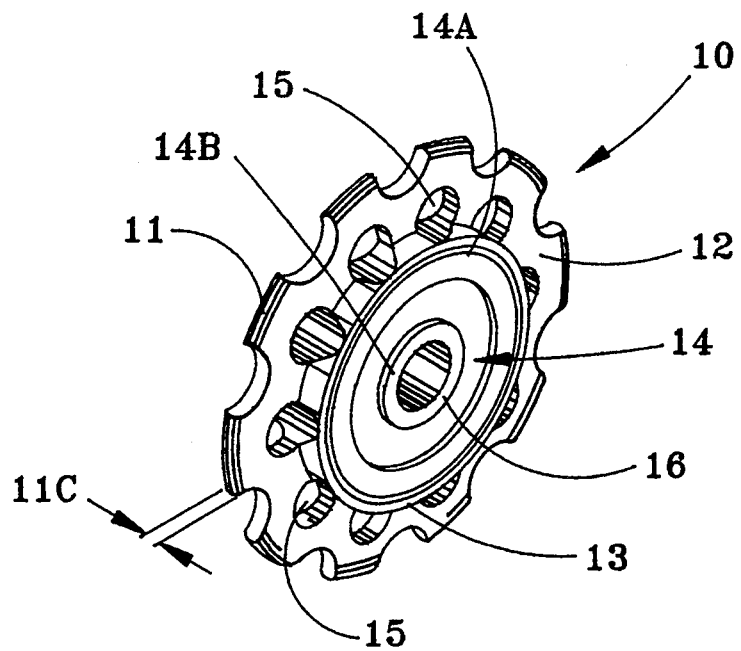
FIG. 3 is a front right perspective schematic illustration of the improved chain guide pulley.

The following is a description of the preferred embodiment of the invention. It is clear that there may be variations in the size and the shape of the pulley, in the materials used in the construction and in the orientation of some of the components or features thereof. However, the main features of the improved rotatable guide pulley of this invention are consistent. The specific advantages of the guide pulley are; being strong and light in weight, having very low rotational friction losses, being compatible with existing derailleur mechanisms or systems and with the varied prior art rear cluster geometries, having a tooth geometry which allows for an amount of misalignment of the derailleur and the gear cluster assembly providing thereby consistent and reliable speed changing using the derailleur mechanism and a plurality of apertures located on the pulley which collectively, while in rotation and normal use, act to promote the constant and easy clearing of debris collected onto the derailleur pulley directly as a consequence of it being in use by the normal rotation thereof. It is also noted that the improved chain guide pulley defined and described herein may also have application and use in derailleur systems other than those systems conventionally used with multi-speed bicycles.

Reference is now made to FIGS. 1-5 all of which illustrate, by sketch, from a complete gear changing system 1, shown in FIG. 1, to detail of the various major components of typical types of speed changing mechanisms or systems for bicycles in the various other figures. Gear changing system 1 is shown consisting of front gear or sprocket assembly 2, drive chain 3, rear derailleur assembly 6, rear gear cluster 4, pair of pedals 8 and a pair of crank arms 9.

Front gear or sprocket assembly 2 typically will have from one (1) to (3) front sprockets 2a, 2b and 2c. The largest front sprockets 2a is positioned most outward of frame component 7 and smallest 2c is positioned most inward toward frame component 7. By applying foot pressure to pedals pairs 8 rotational energy is transferred via crank arms 9 to front sprocket assembly 2. To affect a change is speed (or power) chain 3 may be caused to be derailed from one front gear to another by causing a lateral movement of front derailleur assembly 5.

A further change of speed or power may be accomplished by similarly causing (by well known lever and cable means) a lateral movement of rear derailleur assembly 6. Such lateral movement causes chain 3 to be guided by guide pulleys 10 from any one rear sprocket of rear sprocket cluster 4 to any other one of the cluster 4. Cluster 4 is illustrated as having four (4) coaxially aligned and spaced apart rear sprockets 4a-4d. It should be noted that anyone of ordinary skill is well aware of the manner of functioning of both the front derailleur and rear derailleur assemblies 5 and 6. It is also well known that the free-wheel cluster of sprockets (or gears) may have any number of sprockets and the maximum number is limited by geometries of chain 3, sprocket dimensions and the like. Typically the number of sprockets is from 5 to 7. Four (4) sprockets are illustrated to simply decrease the complexity of the drawing and permit a better understanding of the invention.

FIG. 2 provides for a more detailed view of improved guide pulleys 10 and illustrates the positional relationship of pulleys 10, chain 3 and rear sprocket cluster 4. The mechanism or the means for causing the lateral movement of guide pulleys 10 is not shown because it does not relate to the instant invention except that pulley 10 has a spindle aperture 16 which permits the assembly of pulleys 10 to be a part of rear derailleur system 6.

A small portion of endless roller chain 3 is illustrated in FIG. 2A. Shown are opposed pairs of outer or pin link plates 3a and opposed pairs of inner or roller link plates 3b. Roller bushings 3c and roller pins 3d are illustrated to show the relationship of the chain components. It is noted that the components and their assembly to form link types of drive chains is well known to one of ordinary skill in the field of bicycling and bicycle design. Of significance to the present invention is the minimum distance 3e defined by the pairs of opposed roller links 3b.

Figure 4:
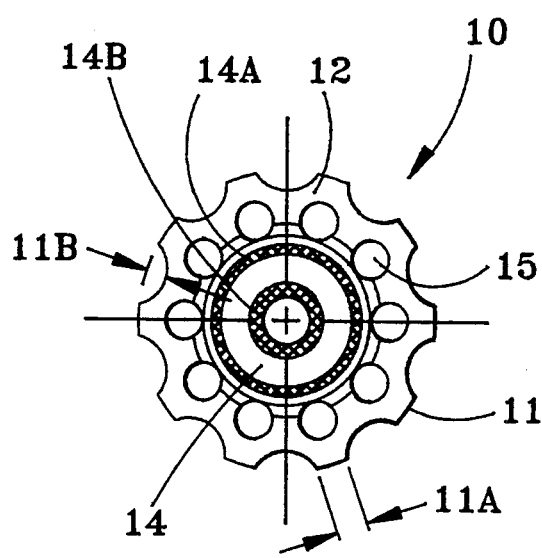
FIG. 4 is a side view of the improved chain guide pulley.
Figure 5:
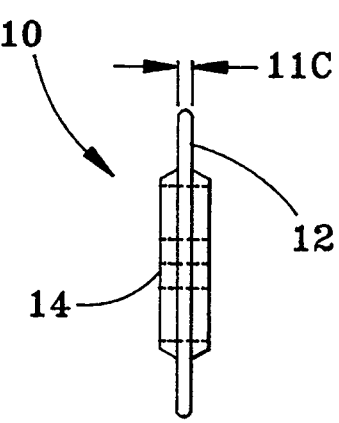
FIG. 5 is an end view of the improved chain guide pulley.

FIGS. 3-5 illustrate collectively the improved guide or rear derailleur pulley 10 of the present invention.

Pulley 10 has a circular outer periphery on which there is cut a number of teeth, collectively identified by numeral 11. Teeth 11 are cut on the periphery of guide sprocket portion 12. Teeth 11 are dimensioned width 11a, depth 11b and thickness 11c to effectively engage drive chain 3. Thickness dimension 11c should be no more than about three-fourths (¾) of the distance 3e of chain 3. The clearance thus obtained results in a more consistent, more reliable shifting of chain 3 from any one rear sprocket such as for example 4d to any other rear sprocket for example 4a. Because of the clearance, the accuracy of the alignment of guide pulley 10 with chain 3 and with a selected sprocket of sprocket cluster 4 is less critical making the use of index shifters more effective without the need for continual or frequent adjustment of system 1. It is now possible, because of this clearance, to use precision, low rotational resistance bearings 14 instead of bushings having lateral play. Thus the performance level of derailleur 6 in greatly improved.

Pulley 10, has tightly fitted and centrally positioned bearing 14. Bearing outer race 14a is preferably sized to press fit into cylindrical shaped inner surface 13 of guide sprocket portion 12. Inner bearing race 14b has an inner aperture or spindle aperture 16 and is sized to be rotatably mountable onto the laterally movable portion of rear derailleur 6. It is obvious that pulley 10 could be fabricated out of one piece of material rather than two portions, a guide sprocket portion 12 and bearing portion 14. It is certainly within the knowledge of those of ordinary skill in related fields that pulley 10 may be made from, for example teflon which has an inherent low friction if spindle aperture 16 was rotatably mounted onto derailleur assembly 6. Further, a low rotational resistant sleeve or bushing could be press fit into inner surface 13 of guide sprocket portion 12. Thus materials such as brass, bronze, aluminum and alloys thereof, titanium, iron and alloys thereof, nylon, teflon, plastic and fiberglass could be used for various components of pulley 10. The clearance provided as a result of width 11c being less than minimum distance 3e between roller links 3b allows the use of precision, rigid, bearings having substantially no lateral play to effectively and reliably shift or guide chain 3 from sprocket to sprocket of cluster 4.

FIGS. 2, 3 and 4 also illustrate debris clearing apertures collectively identified by numeral 15 of the preferred embodiment of pulley 10. While such apertures 15 are each depicted as circular, it may be advantageous to vary the geometry of the periphery of the apertures from aperture 15 to aperture 15. Apertures 15, shown as circular in the preferred embodiment, not only reduce the mass and thus the weight of pulleys 10 but it has been found that during the rotation of pulleys 10, i.e., while the bicycle is being ridden debris is constantly cleared from pulleys 10. For off-road or all terrain bicycles or, for that matter other vehicles using drive chain derailleur shifting systems, not having dirt collect and remain on these pulleys 10 is very advantageous.

It is thought that the present invention, the improved derailleur pulley and its attendant advantages is understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. A chain guide pulley for use with a bicycle rear derailleur system, said chain guide pulley comprising:
   a guide sprocket;
   a substantially circular outer periphery of said guide sprocket;
   a plurality of teeth positioned on said outer periphery, said teeth having predetermined width, depth and thickness dimensions;
   a cylindrical shaped inner peripheral surface axially therethrough said guide sprocket, defining thereby a bearing means aperture, said bearing means aperture having a periphery dimensioned to accept therein, into low frictional rotational bearing relationship, a spindle means of said rear derailleur system; and
   a plurality of circumferentially spaced-apart debris-clearing apertures, said plurality of apertures located on a concentric between said bearing means and said substantially circularly configured outer periphery.

2. A chain guide pulley for use with a bicycle rear derailleur system, said chain guide pulley comprising:
   a guide sprocket;
   a substantially circular outer periphery of said guide sprocket;
   a plurality of teeth positioned on said outer periphery, said teeth having predetermined width, depth and thickness dimensions, said teeth adapted to engage a drive chain, said teeth thickness dimension being not more than about three-fourths of a minimum distance between opposed pairs of roller link plates of said drive chain;
   a cylindrical shaped inner peripheral surface axially therethrough said guide sprocket, defining thereby a bearing means aperture, said bearing means aperture having a periphery dimensioned to accept therein, into low frictional rotational bearing relationship, a spindle means of said rear derailleur system; and
   a plurality of circumferentially spaced-apart debris-clearing apertures, said plurality of apertures located on a concentric between said bearing means and said substantially circularly configured outer periphery.

3. The chain guide pulley according to claim 2 wherein said chain guide pulley is made from at least one of the materials selected from the group consisting of brass, bronze, aluminum and alloys thereof, titanium, iron and alloys thereof, nylon, teflon, plastic and fiberglass.

4. The chain guide pulley according to claim 3 wherein a predetermined number of said plurality of circumferentially spaced-apart debris-clearing apertures each of said predetermined number have circular cross-sections.

5. A chain guide pulley for use with a bicycle rear derailleur system, said chain guide pulley comprising:
   a guide sprocket;
   a substantially circular outer periphery of said guide sprocket;
   a plurality of teeth positioned on said outer periphery, said teeth having predetermined width, depth and thickness dimensions;
   a cylindrical shaped inner peripheral surface axially therethrough said guide sprocket, defining thereby a bearing means aperture, said bearing means aperture having a periphery dimensioned to accept therein, into interfitting relationship, a bearing means, said bearing means having an outer race tightly affixed within said bearing means aperture and having an inner race sized to be attachable to said bicycle rear derailleur system; and
   a plurality of circumferentially spaced-apart debris-clearing apertures, said plurality of apertures located on a concentric between said bearing means and said substantially circularly configured outer periphery.

6. A chain guide pulley for use with a bicycle rear derailleur system, said chain guide pulley comprising:
   a guide sprocket;
   a substantially circular outer periphery of said guide sprocket;
   a plurality of teeth positioned on said outer periphery, said teeth having predetermined width, depth and thickness dimensions, said teeth adapted to engage a drive chain, said teeth thickness dimension being not more than about three-fourths of a minimum distance between opposed pairs of roller link plates of said drive chain;
   a cylindrical shaped inner peripheral surface axially therethrough said guide sprocket, defining thereby a bearing means aperture, said bearing means aperture having a periphery dimensioned to accept therein, into interfitting relationship, a bearing means, said bearing means having an outer race tightly affixed within said bearing means aperture and having an inner race sized to be attachable to said bicycle rear derailleur system; and
   a plurality of circumferentially spaced-apart debris-clearing apertures, said plurality of apertures located on a concentric between said bearing means and said substantially circularly configured outer periphery.

7. The chain guide pulley according to claim 6 wherein said chain guide pulley is made from at least one of the materials selected from the group consisting of brass, bronze, aluminum and alloys thereof, titanium, iron and alloys thereof, nylon, teflon, plastic and fiberglass.

8. The chain guide pulley according to claim 1 wherein a predetermined number of said plurality of circumferentially spaced-apart debris-clearing apertures each of said predetermined number have circular cross-sections.

9. In a bicycle having a drive chain, said drive chain having a minimum distance between each of a plurality of opposed pairs of roller link plates, at least two spaced-apart, coaxially mounted rear sprockets, said sprockets having teeth with arcuate roller seats adapted to accept a number of roller bushings of said drive chain, said bicycle also having an improved laterally-adjustable guide means with two rotatable guide pulleys as parts thereof, said guide means adaptable for aligning each of said two rotatable guide pulleys with any one of said sprockets for guiding, with said two rotatable guide pulleys, said drive chain onto any one of said sprockets, said guide means also adapted for causing said drive chain to shift from any one of said sprockets to any other, said improvement of said guide means comprising:

two improved rotatable guide pulleys each having a substantially circularly configured outer periphery with a plurality of guide pulley teeth thereon adapted to engage said drive chain, said guide pulley teeth thickness dimension being not more than about three-fourths of said minimum distance between said opposed pairs of roller link plates;

guide pulley bearing means fixedly centered within each said two guide pulleys, said bearing means adapted to permit substantially no lateral movement of said guide pulley teeth relative to said bearing means when said improved guide pulleys are in use for shifting said drive chain from said any one to any other of said sprockets; and a plurality of circumferentially spaced-apart debris-clearing apertures, said plurality of apertures located on a concentric between said bearing means and said substantially circularly configured outer periphery on each of said improved rotatable guide pulleys.

10. The improved laterally-adjustable guide means according to claim 9 wherein each of said two improved rotatable guide pulleys is made from at least one of the materials selected from the group consisting of brass, bronze, aluminum and alloys thereof, titanium, iron and alloys thereof, nylon, teflon, plastic and fiberglass.

* * * * *